(12) United States Patent
Nayar et al.

(10) Patent No.: US 9,317,861 B2
(45) Date of Patent: Apr. 19, 2016

(54) VIEW-INDEPENDENT ANNOTATION OF COMMERCIAL DATA

(75) Inventors: Narayan Madhavan Nayar, Oak Park, IL (US); Scott Lawrence Neufeld, Trumbull, CT (US)

(73) Assignee: Information Resources, Inc., Chicago, IL (US)

(*) Notice: Subject to any disclaimer, the term of this patent is extended or adjusted under 35 U.S.C. 154(b) by 372 days.

(21) Appl. No.: 13/435,108

(22) Filed: Mar. 30, 2012

(65) Prior Publication Data

US 2012/0254718 A1   Oct. 4, 2012

Related U.S. Application Data

(60) Provisional application No. 61/469,483, filed on Mar. 30, 2011.

(51) Int. Cl.
| | |
|---|---|
| *G06F 17/00* | (2006.01) |
| *G06Q 30/02* | (2012.01) |
| *G06F 17/24* | (2006.01) |

(52) U.S. Cl.
CPC ............ *G06Q 30/02* (2013.01); *G06F 17/241* (2013.01)

(58) Field of Classification Search
CPC ... G06F 17/241; G06F 17/2235; G06F 17/30; G06F 17/30023; G06F 17/30979; G06F 17/30991; G06F 3/0484
USPC .................................................. 715/229, 230
See application file for complete search history.

(56) References Cited

U.S. PATENT DOCUMENTS

| | | | | |
|---|---|---|---|---|
| 5,625,833 | A | * | 4/1997 | Levine et al. .................. 715/203 |
| 5,717,879 | A | * | 2/1998 | Moran ................ G06F 9/45512 707/999.002 |
| 6,266,682 | B1 | * | 7/2001 | LaMarca et al. .............. 715/234 |
| 6,335,738 | B1 | * | 1/2002 | Englefield et al. ............. 715/744 |
| 6,728,760 | B1 | * | 4/2004 | Fairchild et al. .............. 709/217 |
| 7,162,690 | B2 | * | 1/2007 | Gupta et al. ................... 715/202 |
| 7,624,114 | B2 | | 11/2009 | Paulus et al. |
| 7,650,343 | B2 | * | 1/2010 | Fellenberg et al. ......... 707/999.1 |
| 7,739,583 | B2 | * | 6/2010 | Barrus et al. .................. 715/201 |
| 7,865,815 | B2 | * | 1/2011 | Albornoz et al. ............. 715/229 |
| 7,865,816 | B2 | * | 1/2011 | Tanaka ........................... 715/230 |
| 7,886,221 | B1 | * | 2/2011 | Underwood et al. ......... 715/234 |
| 8,180,754 | B1 | * | 5/2012 | Ershov .......................... 707/706 |
| 8,201,079 | B2 | * | 6/2012 | Cragun et al. ................ 715/230 |
| 8,266,519 | B2 | * | 9/2012 | Verma et al. .................. 715/229 |
| 8,346,800 | B2 | * | 1/2013 | Szummer .......... G06F 17/30705 707/771 |
| 8,606,046 | B2 | * | 12/2013 | Bern et al. ..................... 382/294 |
| 8,639,685 | B2 | * | 1/2014 | Huang et al. .................. 707/721 |
| 8,849,991 | B2 | * | 9/2014 | Levy et al. ..................... 709/224 |
| 2001/0051958 | A1 | * | 12/2001 | deVries ............. G06F 17/30817 715/233 |
| 2004/0163042 | A1 | * | 8/2004 | Altman ............. G06F 17/30722 715/233 |
| 2005/0107690 | A1 | * | 5/2005 | Soejima ......................... 600/425 |
| 2005/0210008 | A1 | * | 9/2005 | Tran et al. ......................... 707/3 |
| 2005/0234958 | A1 | * | 10/2005 | Sipusic et al. ................. 707/102 |

(Continued)

*Primary Examiner* — Laurie Ries
(74) *Attorney, Agent, or Firm* — Strategic Patents, P.C.

(57) ABSTRACT

A first view of commercial data is presented to a first user. A data selection criterion is received from the user. A first data set is identified based on the selection criterion. Annotation content is received from the user. The annotation content and the first view of the commercial data is associated with the first data set. A query is received for a second view from a second user, in which the second view includes at least a portion of the first data set. The second view is presented to the second user, together with the annotations associated with the portion of the first data set included in the second view.

20 Claims, 5 Drawing Sheets

(56) References Cited

U.S. PATENT DOCUMENTS

| | | | |
|---|---|---|---|
| 2006/0085750 A1* | 4/2006 | Easton, et al. | 715/708 |
| 2006/0253421 A1* | 11/2006 | Chen | G06F 17/30964 |
| 2007/0022135 A1* | 1/2007 | Malik | 707/102 |
| 2007/0150802 A1* | 6/2007 | Wan et al. | 715/512 |
| 2007/0156636 A1* | 7/2007 | Norton | G06F 17/30997 |
| 2008/0209310 A1* | 8/2008 | Cragun et al. | 715/230 |
| 2008/0270406 A1* | 10/2008 | Flavin et al. | 707/8 |
| 2009/0024660 A1* | 1/2009 | Borgsmidt et al. | 707/104.1 |
| 2009/0031401 A1* | 1/2009 | Cudich et al. | 726/4 |
| 2009/0049046 A1* | 2/2009 | Godzik et al. | 707/9 |
| 2009/0144313 A1* | 6/2009 | Hodge et al. | 707/102 |
| 2011/0184828 A1* | 7/2011 | Siegel et al. | 705/26.1 |
| 2011/0238379 A1* | 9/2011 | Misra | G06F 19/3418 702/187 |
| 2011/0270856 A1* | 11/2011 | Dettinger et al. | 707/758 |
| 2013/0185622 A1* | 7/2013 | Odean et al. | 715/230 |

* cited by examiner

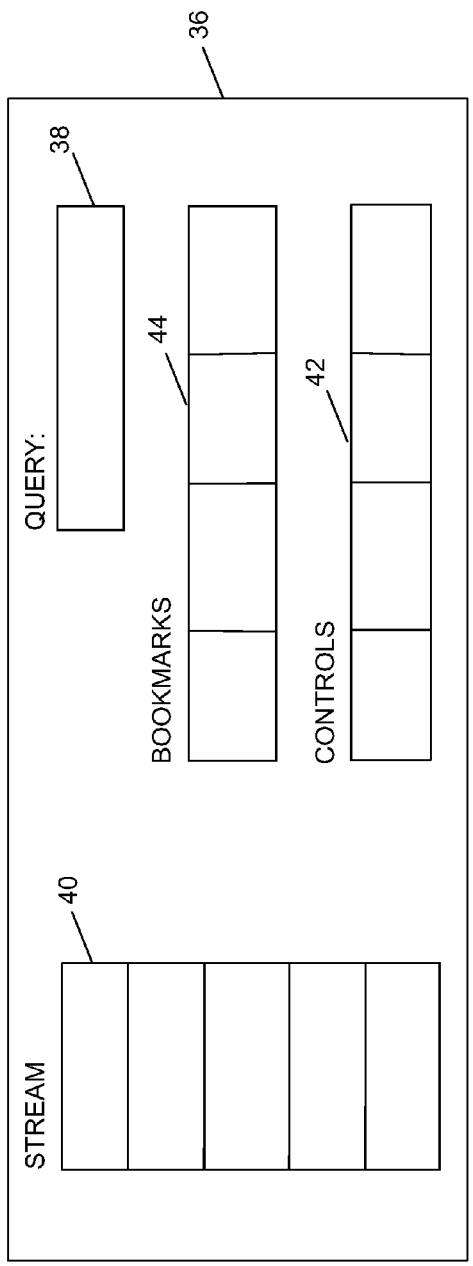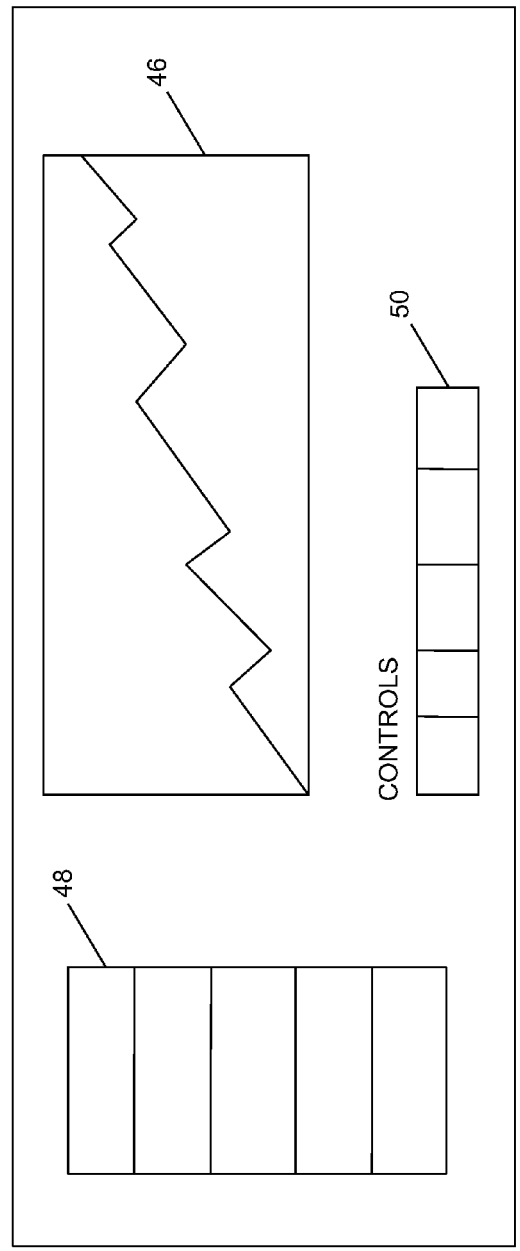

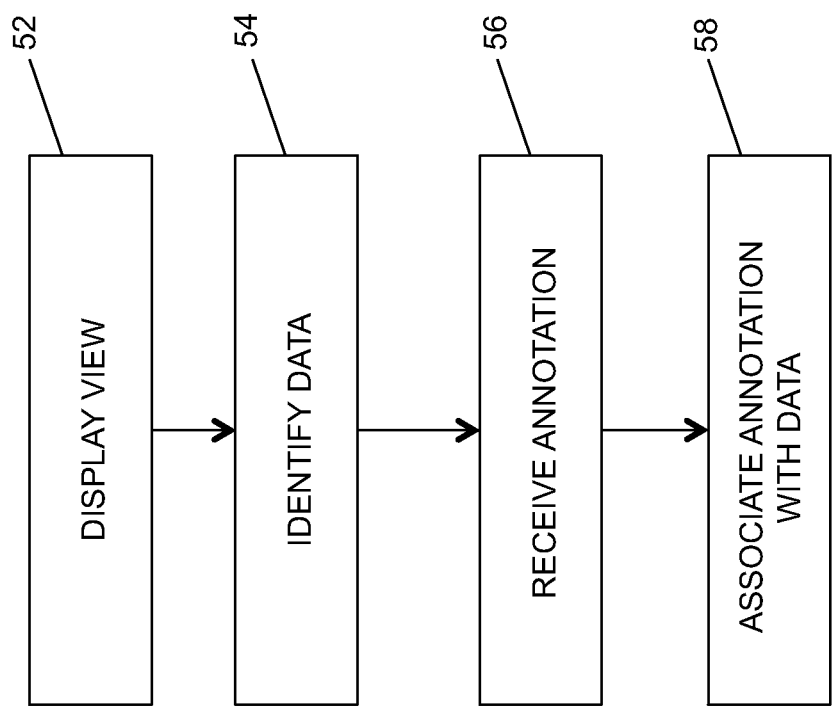

VIEW-INDEPENDENT ANNOTATION OF COMMERCIAL DATA

RELATED APPLICATIONS

This application claims the benefit of provisional application 61/469,483, filed Mar. 30, 2011, the entire contents of which are hereby incorporated by reference.

TECHNICAL FIELD

This document relates to annotating commercial data.

BACKGROUND

Various techniques for gathering, analyzing, and viewing commercial data exist. For example, these existing techniques can be used to generate reports that draw data from vast databases of commercial data. For example, such reports may include an analysis of one or more metrics of one or more products in one or more retail outlets, in one or more geographic regions, over various time periods, etc.

One often uses such reports to gain insight into commercial activity. For example, one may learn from a report that a particular product is doing well in certain commercial outlets, and conjecture how to improve the product's performance in other commercial outlets. These insights are often recorded (electronically or otherwise) on the report in such a way as to be shared with other viewers of the report.

SUMMARY

In general, in one aspect, a commercial data store containing commercial data; an annotation data store containing annotations associated with the commercial data store; a report generator for presenting data from the commercial data store pertinent to a query, and an annotation from the annotation data store pertinent to the data wherein the annotation includes an associated view of the commercial data under consideration at the time the annotation was made.

In general, in another aspect: presenting a first view of commercial data to a first user; receiving a data selection criterion from the user; identifying a first data set based on the selection criterion; receiving annotation content from the user; associating the annotation content and the first view of the commercial data with the first data set; receiving a query for a second view of the commercial data from a second user, in which the second view includes at least a portion of the first data set; presenting the second view of the commercial data to the second user, together with the annotations associated with the portion of the first data set included in the second view.

Implementations may include one or more of the following features: The commercial data is stored a database containing records, each record corresponds to a commercial item, and each annotation is stored in a corresponding record of the commercial item to which the annotation pertains. Available commercial items include a product, a collection of products, a store, a collection of stores, a transaction, a collection of transactions, a time, and a time frame. The annotations are stored in a database separate from the commercial data, and wherein the annotations are linked to the commercial data by one or more keys. The annotations are stored in a database separate from the commercial data, and wherein the annotations are linked to the commercial data by one or more dimensional constraints. The annotations are presented as a threaded conversation. The annotations are presented chronologically. The first data set is stored in a database comprising records, and in which each record corresponds to a commercial item, the method further comprising storing the annotation content in the records of the first data set. The first data set is stored in a database comprising records, and in which each record corresponds to a commercial item, the method further comprising linking the annotation content to the records of the first data set.

DESCRIPTION OF DRAWINGS

Embodiments of the invention described herein may be understood by reference to the following figures, which are provided by way of example and not of limitation:

FIGS. 3A-B are schematic views of an exemplary user interface for the data annotation system.

FIG. 4 is a flowchart for annotating data.

Figure 1:
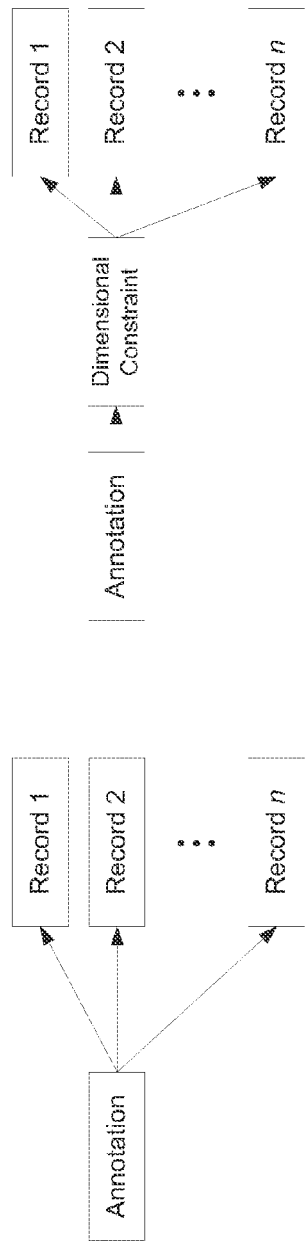
FIGS. 1A-B are exemplary records in a commercial database.
FIGS. 1C-D are schematic depictions of associating annotations with commercial data.

Like references numbers refer to like structures.

DETAILED DESCRIPTION

Participants in a market often maintain or have access to various collections commercial data. In this document, "participant" refers to any entity participating in a market, whether or the supply side or demand side, including retailers, manufacturers, publishers, consumers, etc. Moreover, the term "market participant" includes third-party analysts or aggregators of market data, even if they do not conduct transactions in the market itself.

Commercial data can be, but need not be, maintained in a database. In what follows, reference will be made to various database concepts (e.g., data in a record or field, categories or dimensions of data, views of a database, etc.). However, this database-type language is employed for convenience, and the data sets described herein need not bear a database structure unless such a requirement is otherwise specified. Moreover, reference will be made below to records in a single database. In practice, the information described below may actually be distributed across several databases or other data structures and linked in various ways. Efficient or optimal implementations of the techniques described below depend on various factors independent of the techniques themselves, such as the volume of data, the number of users, the cost or capabilities of available hardware, the financial resources of the entity implementing the techniques, etc.

Market participants often have a variety of existing analytical platforms at their disposal to analyze commercial data. These analytical platforms can either be in-house at the market participant, available from an outside service provider, or a combination of the two. These analytical platforms are generally capable of identifying desired data, computing various metrics associated with the desired data, and displaying these metrics and/or desired data in the form of a report. For example, a market participant interested in the performance of a particular product may use an analytical platform to identify the total volume of sales of the product at particular store, collection of stores, geographic area, etc. and compare that total volume to other commercial data (e.g., sales of a competing product; projected sales of the selected product, sales in a different store, collection of stores, or geographic area, etc.)

A common practice is to annotate particular reports. Such annotations, together with the reports themselves, often facilitate insights into the reported data or previously unmeasured market behavior. Such insights, for example, can relate to the effectiveness of a given marketing campaign, product attributes that consumers are particularly sensitive to, previously unmeasured or unobserved phenomena, or other valuable actionable conclusions. In turn, insights can build on or amplify each other, increasing their collective value to the market participant.

However, when annotations are made in association with a particular report, those annotations are typically not available in other reports, even if those other reports are similar to the annotated report or draw on the same data. Thus, users of the subsequent report may not have the benefit of the original annotations.

Moreover, the presence of multiple annotations made with respect to a certain collection of data may indicate a particular significance of the data. Thus, the annotations themselves, by their mere existence or type (and not necessarily their content) can collectively provide additional insights into the data. However, when the annotations are distributed across various different reports, their full number or scope may be difficult to identify.

The techniques described below can help mitigate these problems and make advantageous use of annotations on data, by associating annotations with the data itself, as opposed to a particular report.

FIG. 1A is an exemplary record 10 of commercial data in a database. The record may correspond to a commercial item, for example, a particular product, collection of products, store, collection of stores, transaction, collection of transactions, time or time frame, another commercially relevant event, etc. For the sake of convenience, the remainder of the techniques in this document will take place in the context in which the record corresponds to a single product, although the techniques are not limited to this context.

The record 10 includes various attributes 12 and values 14. These attributes 12 correspond to potential properties of the product (e.g., brand name, flavor, size, color, etc.), and the values correspond to particular properties of the particular product (e.g., Acme, cherry, large, red, etc.). For a given product, not all attributes 12 need have values 14. For example, a record corresponding to an automobile is unlikely to have a meaningful value of a "flavor" attribute.

The attributes 14 may also reflect commercial activity involving the product, including instances in which the product was sold, the price at which it was sold, the store at which it was sold, whether or not it was included in a promotion or special offer at the time of the sale, etc.

Traditionally, a report can be prepared by identifying desired records (e.g., all automobiles sold in a specified geographic area during a specified time), extracting some or all of the information included in the desired records (e.g., sales volumes), and presenting the information in a desired form (e.g., in a chart, in a graph, in a table, etc.), and served in desired document (e.g., word processor document, portable document format (PDF) document, spreadsheet, etc.). Traditional annotations of such a report would be recorded in the document. However, as described more fully below, annotations are associated with the data itself (rather than a document containing the data) using the current techniques.

FIG. 1B is an annotated version of the exemplary record of FIG. 1A. In FIG. 1B, a user has made an annotation implicating this record with the comment, "Why did sales spike here?" This annotation, together with other information as described below, is stored (in some implementations) in a separate annotation field 16 of the record itself. A "view" may also be associated with an annotation. The view includes information sufficient to reconstruct what was being displayed at the time the annotation was made. For example, if the user who made a particular annotation was viewing a report generated by a query, then the query may be included in the "view" field. Other view-related information, such as cursor or mouse positioning, highlighting, zoom levels, display-related options, etc., may also be included in the "view" field, to fully reconstruct what was being displayed at the time the annotation was made.

In some implementations, the annotation fields 16 need not be part of the record 10, but rather may be contained stored as separate and independent records themselves, even in a different database. In these implementations, the appropriate annotations can be linked with their corresponding record(s), e.g., via a key. This is shown in FIG. 1C As is shown in FIG. 1D, in some implementations, annotations may be similarly linked with certain dimensions (or combinations of dimensions, including intersections of dimensional constraints), and not necessarily directly associated with records 10. This association may be static or dynamic. A static association links an annotation to the dimensions, dimensional constraints, etc. as they existed in the database at the time of the annotation. Conversely, a dynamic association links the annotation to dimensions, dimensional constraints, etc. irrespective of how the database changes or which records 10 currently satisfy the dimensional constraints.

For example, one may associate an annotation with a particular flavor and a particular brand. If that association were static, then a new product record entering the database after the annotation was made would not be associated with the annotation. However, if the association were dynamic (and the product was from the particular manufacturer and had the particular flavor) then it would be associated with the annotation, even though that product's record did not exist at the time the annotation was made.

Figure 2:
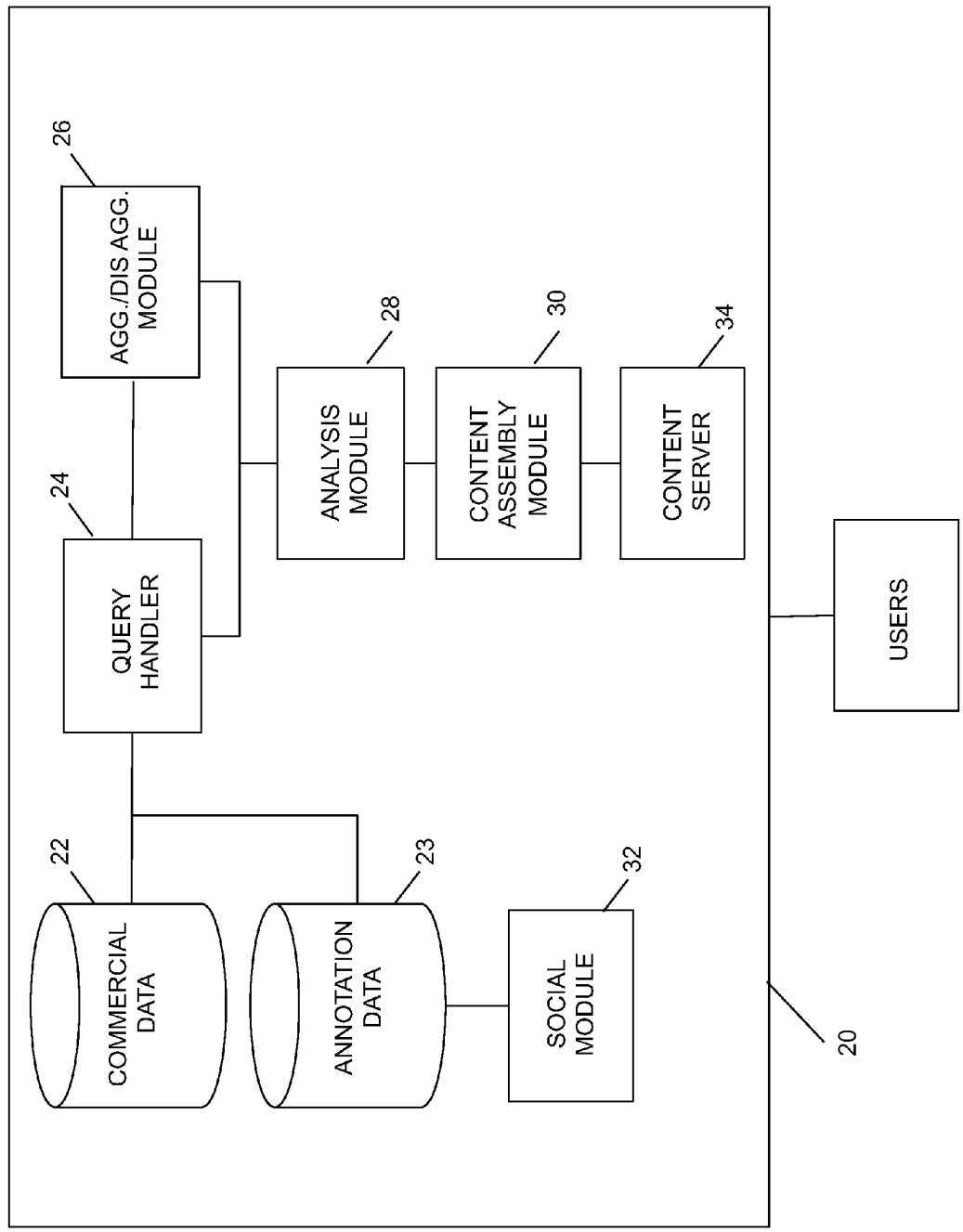
FIG. 2 is a block diagram of a data annotation system.

FIG. 2 is a block diagram of a data annotation system. The system 20 includes a data store 22 of commercial data, a data store 23 of annotations, a query handler 24, an aggregation/disaggregation module 26, a data analysis module 28, a content assembly module 30, a social module 32, and a content server 34. Each of the various components 22-34 of the system can be implemented as software, hardware, or a combination of hardware and software as described more fully below. The components 22-34 are in mutual data communication, either directly or indirectly through other components of the system 20. The data communication can be implemented in any way, such as by direct wired or wireless communication between separate hardware components, logical communication within a hardware component shared by two or more components 22-34 of the system, etc. Although the components 22-34 of the system 20 are depicted in separate blocks of the block diagram, in some implementations some components may be contained in, or overlap with, other components. Conversely, the components 22-34 need not be implemented so as to share hardware in common. One or more communication layers (e.g., implemented by routers, load balancers, web servers, etc.) may facilitate communication between and amongst the components 22-34.

The data store 22 includes the database of commercial data as described above. The query handler 24 is operable to identify records that are responsive to a given query. The query may be submitted in any known form (e.g., in Structured Query Language ("SQL"), natural language, or other query form). Once identified, the query handler 24 passes the records (or links to the records) to other modules, as appropriate.

The aggregation/disaggregation module 26 operates in one of two modes: aggregation or disaggregation. In aggregation mode, the module 26 combines the information in various records to a level of aggregation desired by a user or another component of the system 20. Aggregation can involve adding or otherwise combining numerical values, combining or concatenating text values, removing or ignoring text or numerical values, etc. For example, if a user desired an analysis of all beverage sales in a particular store, then the query handler 24 may return records corresponding to coffee sales, tea sales, and flavored water sales. The aggregator may add certain numerical information (e.g., number of sales), average certain information (e.g., price of each sale), ignore certain information (e.g., the flavor of each particular beverage sold), etc.

In some implementations, when aggregating data points, the aggregation/disaggregation module 26 includes annotations of individual data points into the aggregated data points. For example, if various products are integrated into a single record to describe the entire product line, then the annotations made on each of the individual products will be incorporated as annotations for the single aggregated record describing the product line.

In some implementations, only a subset of annotations will be included under aggregation operations. These annotations can be included or excluded based on any criteria; e.g., the annotation type, the annotation author (e.g., annotations from users in a certain group would not be aggregated; annotations from users in a certain group would be, etc.), annotation content (e.g., aggregating annotations with or without key words, etc.), or other criteria.

In the disaggregation mode, the aggregation/disaggregation module 26 is operable to propagate annotations of aggregated data points down to the data point's constituent components. For example, if an annotation is made on an aggregated data point representing a product line, the module 26 identifies the particular products that make up the product line. As with aggregation of annotations, the disaggregation of annotations can optionally be suppressed according to any desired criteria.

The data analysis module 28 is operable to compute or otherwise determine desired information not contained in the records themselves. For example, such information can involve statistical quantities computed from a collection of records, comparisons across collections of records, evaluation of metrics pertinent to the records, interpolations, extrapolations, or projections using the data in the records, etc. The data analysis module 28 is also operable to draw data from other sources, either internal or external to the system 20, in performing its analyses.

The content assembly module 30 is operable to collect the information contained in or associated with provided records, together with derived information provided by the data analysis module 28, and combine or present the information in a desired form. In some implementations, the content assembly module 30 can output documents, scripts, source code, executable code, or combinations of the above to present the information. For example, the content assembly module can produce one or more markup language documents, such as hypertext markup language (HTML), extensible markup language (XML); as well as source or object code in Java, JavaScript, FLASH, or data in other formats suitable for presentation. In some implementations, the content assembly module can output hyperlinks (or other references) that point to annotation content stored in a remote location. In some implementations, the content assembly module 30 is operable to interface with special-purpose software or hardware to present content.

The social module 32 is operable to maintain a social environment in connection with the data annotation system 20. In some implementations, the social environment includes one or more streams of annotations made by one or more users of the system 20.

In some implementations, the users of the system 20 are organized (or may self-organize) according to relations. For example, users working in a given department or on a given project may, by default, be related in the social environment. Additionally or alternatively, users may initiate relationships amongst each other for any reason. In some implementations, characteristics of the relation (e.g., coworker, classmate, friend, etc.) is stored by the social module. The collection of the users and their relations is referred to as the social graph of the system 20. For a given user, the collection of other users who are connected (directly or indirectly) to the given user is referred to as the social graph of the user.

The content server 34 is operable to present output of the system 20 to one or more users. In some implementations, the content server 34 includes a web server operable to serve the markup documents, source, or executable code to the users of the system 20. In some implementations, the content server 34 is operable to interface with special purpose viewing software or hardware. In some implementations, the viewing software includes a web browser. In some implementations, the viewing software includes a mobile application suitable for execution on a mobile computing device, such a smart phone, tablet, netbook, laptop, etc.

FIGS. 3A and 3B are schematic views of an exemplary user interface for the data annotation system. FIG. 3A shows a home screen 36. In some implementations, the home screen 36 is presented to the user upon signing in to the data annotation system 20. The home screen includes a query input area 38, a social stream 40, controls 42, and bookmarks 44. The home screen may include other functionality, for example functionality to integrate the system 20 to other aspects of an enterprise or desired user content.

The query input area 38 is operable to accept a query from the user and pass it to the data annotation system 20, to generate a corresponding report. In some implementations, the query input area 38 includes a "query builder" tool, which is operable to help a user build correctly structured queries. The query builder can include, for example, various drop-down menus for available attributes, constraints on the attributes, and logical connectives amongst constraints.

The social stream 40 includes comments made by other users of the data annotation system 20. Such comments can include annotations on specific data or groups of data, or comments not associated with any data. In some implementations, the social stream 40 can be organized or filtered in various ways, presented in various fashions, etc. For example, a user can organize comments by author, or in a threaded discussion fashion, or in a chronological fashion, or any other fashion. A user can filter the social stream by any criteria; e.g., by user or group of users, by topic, by keyword, by tag, etc.

The controls 42 allow the user to interact with the data annotation system 20. For example, the controls 42 allow the user to respond to comments, post original comments, subscribe to or unsubscribe from streams from others in the user's social graph, change user account settings, export content from the system 20, etc.

FIG. 3B shows a report viewing screen in the user interface. The report viewing screen includes a report area 46, a social area 48, and controls 50. In some implementations, the data annotation system presents results of a query or a selected data view in this screen.

The report area 46 presents commercial data or analysis served by the content server 34. In some implementations, the content is interactive in various ways. For example, in some implementations users can zoom, scroll, color-code, and otherwise manipulate the appearance of the data. In some implementations, users can superimpose or otherwise combine different reports and/or external content.

The social area 48 includes the annotations made in connection with any of the data currently being shown the report area 46. These annotations can be organized or filtered in any manner, as described above.

The controls 50 include controls for navigating through the annotations and/or the data, as well as navigating to other screens (e.g., the home screen) in the user interface. The controls 50 also includes a control for bookmarking particular views or highlighting particular annotations.

Each annotation is associated with one or more views, which may be different from the view currently displayed to the user. For each annotation, there is a control for switching to the view associated with the annotation. The controls 50 also include a control for annotating selected data in the report area 46, as described below.

FIG. 4 is a flowchart for annotating data. In step 52, the user is presented with a desired view of the available commercial data. The user then identifies data he wishes to annotate (step 54). In some implementations, the data is identified graphically; e.g., by selecting the desired data from the desired view with a cursor, mouse, or by touch.

In some implementations, the data is identified abstractly, by providing selection criteria. For example, the selection criteria could include a database query. The database query could, for example, specify an intersection of various dimensional constraints. This intersection could be "static," i.e., identifying a fixed group of products sold in a fixed location on a fixed date. The intersection could be "dynamic," i.e., identifying data that could change with time. For example, one could provide an annotation to the top proportion of performing products within a product category. This top proportion often changes with time, as various products' performances change.

Thus, for example, one may annotate a dimension or combination of dimensions without regard to what records intersect that dimension or those dimensions at a given time.

After identifying the data to be annotated, the user provides the annotation itself to the system 20 (step 56). The annotation includes text, graphics, audio, video, source code, object code, or links to content outside the system 20. In some implementations, the annotation can also include metadata, such as one or more tags describing content or categories to which the annotation applies. In some implementations, the annotation can further include aggregation behavior preferences, specifying whether the annotation should or should not be aggregated or disaggregated as described above.

In step 58, the annotation, together with the particular view under consideration by the user at the time the annotation was made, is associated with the selected data. In some implementations, the user may also provide additional views to associate with the annotation. In some implementations, the association of annotations with data can be carried out in the manner described above in connection with FIGS. 1A-1D; i.e., by recording the annotation in the record(s) of the identified data. In some implementations, the annotation can be stored in a separate data store and linked in any manner to the data (e.g., records of the type depicted in FIG. 1A-D) itself.

Figure 5:
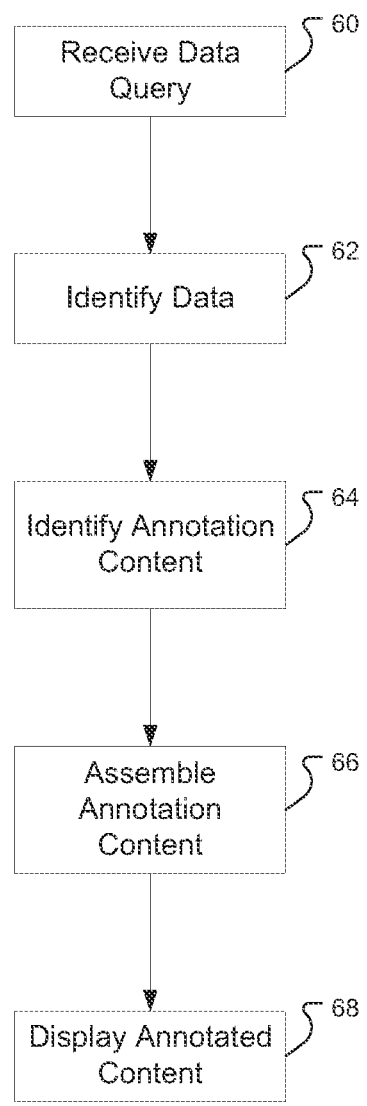
FIG. 5 is a flowchart for presenting annotated data.

FIG. 5 is a flowchart for presenting annotated data. In step 60, a query for data (or more generally, any data selection criterion) is received. In some implementations, the query is handled by the query handler 24. Next, data relevant to the query is identified (step 62). In some implementations, the data is identified by the aggregation/disaggregation module 26 and/or the analysis module 28. Next, pertinent annotations are identified (step 64). These annotations include annotations associated with data responsive to the query, in which the association is implemented in any of the ways described above. Next, the annotation content is assembled and packaged with the data responsive to the query (step 66). In some implementations the preceding two steps are performed by the content assembly module 30. In some implementations, the previous two steps can be performed asynchronously with respect to other activities occurring on the client device. For example, while the annotations are being assembled (whether on a client device or remotely), the client may continue to perform other analytic or computing tasks. Finally, the assembled content is presented to the user (step 68). In some implementations, the presentation takes place in a user interface such as that described in connection with FIGS. 3A and 3B.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In some embodiments disclosed herein are computer program products comprising computer-executable code or computer-usable code that, when executing on one or more computing devices (such as the devices/systems described above), performs any and/or all of the steps described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The meanings of method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

Thus for example, a description or recitation of "adding a first number to a second number" includes causing one or more parties or entities to add the two numbers together. For example, if person X engages in an arm's length transaction with person Y to add the two numbers, and person Y indeed adds the two numbers, then both persons X and Y perform the step as recited: person Y by virtue of the fact that he actually added the numbers, and person X by virtue of the fact that he caused person Y to add the numbers. Furthermore, if person X is located within the United States and person Y is located outside the United States, then the method is performed in the United States by virtue of person X's participation in causing the step to be performed.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A data annotation system comprising:
   a commercial data store containing commercial data arranged in a database with a number of records;
   an annotation data store containing annotations associated with the commercial data store; and
   a report generator for presenting a report including:
      a view of data from the commercial data store pertinent to a query; and
      an annotation from the annotation data store pertinent to the data;
   wherein the annotation is a view-independent annotation containing a description of the query, the view, at least one aggregation behavior preference specifying whether the annotation should be aggregated or disaggregated with the data in the view, and other information to reconstruct a context in which the annotation was made, and wherein the annotation is linked to the view of data from the commercial data store.

2. The system of claim 1, wherein the annotation is stored in one of the number of records in the database corresponding to a commercial item to which the annotation pertains.

3. The system of claim 2, wherein available commercial items include a product, a collection of products, a store, a collection of stores, a transaction, a collection of transactions, a time, and a time frame.

4. The system of claim 1, wherein the annotations are stored in a database separate from the commercial data, and wherein the annotations are linked to the commercial data by one or more keys.

5. The system of claim 1, wherein the annotations are stored in a database separate from the commercial data, and wherein the annotations are linked to the commercial data by one or more dimensional constraints.

6. A method comprising:
   receiving a query from a user including data selection criterion for retrieving data from a commercial data store containing commercial data arranged in a database with a number of records;
   identifying a first view containing a first data set based on the query;
   presenting the first view to the user in a display;
   receiving an annotation from the user linked to the data in the first view, wherein the annotation is a view-independent annotation containing a description of the first view, the query for the first view, at least one aggregation behavior preference specifying whether the annotation should be aggregated or disaggregated with the data in the first data set, and other information to reconstruct a context in which the annotation was made;
   using a computer, associating the annotation with the first data set and the query that produced the first view;
   receiving a query for a second view of the commercial data from a second user, in which the second view includes at least a portion of the first data set associated with the annotation; and
   presenting the second view of the commercial data to the second user, together with the annotation.

7. The method of claim 6, wherein the annotation is presented within a threaded conversation including a plurality of annotations from one or more users.

8. The method of claim 6, wherein the annotation is presented chronologically with a plurality of annotations from one or more users.

9. The method of claim 6 further comprising storing the annotation in one of the number of records in the database containing a commercial item associated with the annotation.

10. The method of claim 6 further comprising linking the annotation to one of the records of the database.

11. The method of claim 6 further comprising linking the annotation to the data with a static association that links the annotation to a dimensional constraint of the commercial data as the dimensional constraint existed at the time of the annotation.

12. The method of claim 6 further comprising linking the annotation to the data with a dynamic association that links the annotation to a dimensional constraint of the commercial data irrespective of how the commercial data changes.

13. A computer program product for annotating data, the computer program product comprising computer-executable code embodied in a non-transitory computer readable medium that, when executing on one or more computing devices, performs the steps of:
   receiving a query from a user including data selection criterion for retrieving data from a commercial data store containing commercial data arranged in a database with a number of records;
   identifying a first view containing a first data set based on the query;
   presenting the first view to the user in a display;
   receiving an annotation from the user linked to data in the first view and including information from the user, wherein the annotation is a view-independent annotation containing a description of the first view, the query for the first view, at least one aggregation behavior preference specifying whether the annotation should be aggregated or disaggregated with the data in the first data set, and other information to reconstruct a context in which the annotation was made;

associating the annotation with the first data set and the query that produced the first view;

receiving a query for a second view of the commercial data from a second user, in which the second view includes at least a portion of the first data set associated with the annotation; and presenting the second view of the commercial data to the second user, together with the annotation.

14. The computer program product of claim 13 wherein associating the annotation with the first data set includes associating the annotation with a dimensional constraint of the query.

15. The computer program product of claim 13 wherein associating the annotation with the first data set includes storing the annotation in a second database and linking the annotation to one of the records in the first data set.

16. The computer program product of claim 13 further comprising code that performs the step of receiving a plurality of annotations to the first data set from one or more users.

17. The computer program product of claim 16 further comprising code that performs the step of arranging the plurality of annotations in a threaded message.

18. The computer program product of claim 16 further comprising code that performs the step of arranging the plurality of annotations chronologically.

19. The computer program product of claim 13 wherein associating the annotation with the first data set includes storing information sufficient to reconstruct a display of the first data set at the time that the annotation was made.

20. The computer program product of claim 19 wherein the information includes at least one of cursor positioning, highlighting, and zoom levels.

* * * * *